(12) United States Patent
Lee et al.

(10) Patent No.: US 7,263,207 B2
(45) Date of Patent: Aug. 28, 2007

(54) METHOD AND APPARATUS FOR VIDEO OBJECT TRACKING

(75) Inventors: Sung-hee Lee, Seoul (KR); Jong-ha Lee, Kyungki-do (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 831 days.

(21) Appl. No.: 10/382,619

(22) Filed: Mar. 7, 2003

(65) Prior Publication Data

US 2003/0185434 A1 Oct. 2, 2003

(30) Foreign Application Priority Data

Mar. 7, 2002 (KR) ............................... 2002-12155

(51) Int. Cl.
*G06K 9/00* (2006.01)

(52) U.S. Cl. ..................... 382/103; 382/287; 382/291
(58) Field of Classification Search ................ 382/103, 382/107, 153, 154, 287, 291; 348/77; 715/863
See application file for complete search history.

(56) References Cited

U.S. PATENT DOCUMENTS

| | | | |
|---|---|---|---|
| 3,983,474 A | 9/1976 | Kuipers | 324/43 R |
| 5,742,263 A | 4/1998 | Wang et al. | 345/8 |
| 5,856,844 A | 1/1999 | Batterman et al. | 348/207 |
| 5,889,505 A | 3/1999 | Toyama et al. | 345/156 |
| 6,061,644 A * | 5/2000 | Leis | 702/153 |

(Continued)

FOREIGN PATENT DOCUMENTS

JP 11-313250 A 11/1999

(Continued)

OTHER PUBLICATIONS

Machine translation of JP 2000-152067 A.*

(Continued)

*Primary Examiner*—Andrew W. Johns
(74) *Attorney, Agent, or Firm*—Buchanan Ingersoll & Rooney PC

(57) ABSTRACT

Provided are a method for analyzing a video signal from a camera and determining the position, orientation and direction of motion of a predetermined object and a device for the same. The device for video tracking motions of an object includes: a calibration unit for obtaining intrinsic parameters of a video camera; a camera distortion compensation unit for receiving video data, acquiring by the video camera, of a predetermined object on which at least one principal marker is set and removing lens distortion of the received video data using the intrinsic parameters of the camera; a point coordinate extraction unit for receiving video data from which lens distortions are removed by the camera distortion compensation unit, and extracting two-dimensional coordinates of the video data of the principal marker of the object; and a position, orientation and direction of motion estimation unit for estimating and outputting a position, orientation and direction of motion of the object, based on the two-dimensional coordinates input from the coordinate extraction compensation unit, the intrinsic parameters of the camera input from the calibration unit and three-dimensional coordinates displayed on the object. It is possible to set markers on the predetermined object, processing video data of the filmed object and establishing the position, orientation and direction of motion of the object.

4 Claims, 9 Drawing Sheets

U.S. PATENT DOCUMENTS

| | | | |
|---|---|---|---|
| 6,162,191 A | 12/2000 | Foxlin | 600/595 |
| 6,415,043 B1* | 7/2002 | Josefsson | 382/103 |
| 6,724,930 B1* | 4/2004 | Kosaka et al. | 382/154 |
| 6,973,202 B2* | 12/2005 | Mostafavi | 382/103 |
| 2001/0024512 A1 | 9/2001 | Yoronka et al. | 382/103 |
| 2002/0001397 A1 | 1/2002 | Ishikawa et al. | 382/103 |
| 2002/0009222 A1* | 1/2002 | McGibbon et al. | 382/154 |

FOREIGN PATENT DOCUMENTS

| | | |
|---|---|---|
| JP | 2000-152067 A | 5/2000 |
| WO | WO98/30977 A1 | 7/1998 |

OTHER PUBLICATIONS

Machine translation of JP 11-313250 A.*

Chung, J. et al., *POSTRACK: A Low Cost Real-Time Motion Tracking System for VR Application*, Proceedings of the Seventh International Conference on Virtual Systems and Multimedia (VSMM'01), Oct. 2001, pp. 383-392.

Notice to Submit Response issued by the Korean Patent Office in corresponding application 10-2002-0012155 on Jun. 16, 2004.

* cited by examiner

EROSION → DILATION

IMAGE WITH LENS DISTROTION

IMAGE WITH CORRECTED LENS DISTORTION

METHOD AND APPARATUS FOR VIDEO OBJECT TRACKING

BACKGROUND OF THE INVENTION

This application claims the priority of Korean Patent Application No. 2002-12155, filed on Mar. 7, 2002, in the Korean Intellectual Property Office, the disclosure of which is incorporated herein in its entirety by reference.

1. Field of the Invention

The present invention relates to a method for obtaining information on position, orientation and direction of motion of a predetermined object by analyzing video data from a camera pointing at the object and a device for tracking the same, and more particularly, to a device for outputting an image corresponding to the field of view of a user by tracking the motion, i.e., position, orientation and direction of motion of a Head Mounted Display (HMD).

2. Description of the Related Art

A Head Mounted Display is a device worn on the head by a user for displaying an image near the user's eye(s). It is noted that the HMD requires a device for detecting information on position, orientation and direction of motion of the head, in order to be utilized in an application where an interaction with the user's motions is required, such as a virtual reality environment.

The level of detecting information about a user varies depending on the purpose of the application for example, from a level of inputting an image by operating one or more buttons such as a mouse or a joystick to a level of using articulation angles of the user's body. A detecting device of the lowest level is a device for tracking the position and orientation of the head of a user and adds motion tracking functionality to an image displayed by an HMD.

Recently, a widely used device for tracking the head of a user employs a gyroscope attached to the HMD, as disclosed in U.S. Pat. No. 6,162,191. The device has limits in that it can detect the orientation but not the position of the user due to the characteristics of the gyroscope. In addition, the HMD is heavy because the gyroscope is attached thereto the HMD and the speed of detecting motions of the user is low.

Another device for tracking the head of a user uses a magnetic sensor as disclosed in U.S. Pat. No. 3,983,474. The magnetic sensor can precisely detect motions of the head of the user but has limits in that the HMD is heavy because the magnetic sensor is attached to the HMD just like the case of attaching a gyroscope to a HMD. In addition, the device using the magnetic sensor can distort measurements if a metallic material is near the user.

Still another device for tracking the head of a user uses a computer vision method. U.S. Pat. Nos. 5,742,263 and 5,856,844 disclose methods for detecting the location and orientation of a user by attaching a camera to an HMD, markers to a wall where camera light hits and recognizing the positions of the markers. However the device based on these methods also has its limits in that the HMD is heavy due to the camera and light source attached thereto, and it cannot perform in other places except specifically designed places due to the use of markers.

SUMMARY OF THE INVENTION

To overcome the above mentioned and related problems, it is an object of the present invention to provide a device for tracking motions of an object from video data of the object, such as an HMD on which markers are set, and a method for the same.

It is another object of the present invention to provide a display output device using a device for tracking motions of an object by video data according to the present invention.

In one aspect, the present invention provides a device for video tracking motions of an object, the device comprising: a calibration unit for obtaining intrinsic parameters of a video camera; a camera distortion compensation unit for receiving video data, acquired by the video camera, of a predetermined object on which at least one principal marker is set and removing lens distortion of the received video data using the intrinsic parameters of the camera; a point coordinate extraction unit for receiving video data from which lens distortions are removed by the camera distortion compensation unit, and extracting two-dimensional coordinates [of the video date ] of the principal marker of the object; and a position, orientation and direction of motion estimation unit for estimating and outputting a position, orientation and direction of motion of the object, based on the two-dimensional coordinates input from the coordinate extraction compensation unit, the intrinsic parameters of the camera input from the calibration unit and three-dimensional coordinates displayed on the object.

In the device, the principal marker coordinate extraction unit comprises: a principal marker labeling unit for receiving the video data from which lens distortions are removed by the camera distortion compensation unit, assigning each marker of a label of different color and separating the markers into principal markers and additional markers; a noise canceling unit for receiving information about the principal points corresponding to the principal markers, and additional points corresponding to the additional markers from the principal marker labeling unit and canceling noise in two-dimensional regions of the principal markers; and a principal marker decision unit for receiving information about the two-dimensional regions of a principal markers and the additional points from which noise is canceled by the noise canceling unit and obtaining two-dimensional coordinates of the points in an image.

In this case, the principal marker coordinate extraction unit may further comprise a motion estimating unit for receiving two-dimensional coordinates from the video data from the principal marker decision unit and estimating a direction of motion of the points. Preferably, the principal marker decision unit comprises; a linking information analysis unit for receiving labeled video data from which noise is canceled by the noise canceling unit and for separating the points regions from the images, based on linking information of the pixels corresponding to each principal marker region in the image; a principal marker extraction unit for receiving information of the principal marker region from the linking information translation unit and extracting principal marker regions from the image by removing regions which are not principal marker regions, based on brightness information of markers set on the object or relationship information about the markers; and a first moment calculation unit for receiving information about the extracted principal marker regions, obtaining a mean of coordinate values of the points pixels and obtaining coordinates of the points.

In the device according to the present invention, preferably, the position, orientation and direction estimating unit comprises: an orientation and position estimating unit for estimating the position and orientation of the object, based on the intrinsic parameters of the camera received from the camera calibration unit, coordinates of the points received from the principal marker decision unit, and three-dimensional coordinates of the markers set on the object; and a direction estimating unit for estimating a direction of motion of the object, based on the coordinates of the principal makers received from the principal marker decision unit.

In another aspect, the present invention provides a device for displaying an image, the device comprising; a video camera for shooting a predetermined object on which one or more markers are set and generating first video data; a position, orientation and direction of motion tracking unit for processing the first video data and computing the position, orientation and direction of motion of the object; a first display control unit for generating control signals regarding position, orientation and direction of motion of the object and providing a user with a second image corresponding to the position, orientation and direction of motion of the object; and a second display unit for providing the user with second image signal according to the first display control unit.

In the image displaying device, the position, orientation, and direction of motion tracking unit comprises: a camera calibration unit for obtaining intrinsic parameters of a video camera; a camera distortion compensation unit for receiving video data acquired by the video camera of a predetermined object on which at least one principal marker is set, and removing lens distortions of the input video data, using intrinsic parameters of the camera; a principal marker coordinate extraction unit for receiving the video data from which lens distortions are removed by the camera distortion compensation unit and extracting two-dimensional coordinates of the image of the principal marker set on the object; and a position, orientation and direction of motion estimating unit for estimating and outputting a position, orientation and direction of motion of the object, based on the two-dimensional coordinates input from the principal marker coordinate extraction unit, intrinsic parameters of the video camera input from the camera calibration unit and three-dimensional coordinates of the markers set on the object.

In another aspect, the present invention provides a method for video tracking motions of an object on which a plurality of markers are set, the method comprising: obtaining intrinsic parameters of a video camera; receiving video data from the video camera; calculating two-dimensional coordinates of principal markers corresponding to the markers set on the object in the input image from the video camera; and estimating and extracting position, orientation and direction of motion of the object, based on the intrinsic parameters of the video camera and coordinates of the points.

Preferably, the step of calculating two-dimensional coordinates of principal markers corresponding to the markers set on the object in the input image from the video camera comprises: extracting regions of the points corresponding to the markers set on the object from the video data; removing noises in the regions of the points; and calculating two-dimensional coordinates of the points in the input image.

Preferably, the step of calculating two-dimensional coordinates of the points in the input image comprises estimating and obtaining direction of motion of the object.

BRIEF DESCRIPTION OF THE DRAWINGS

The above objects and advantages of the present invention will become more apparent by describing in detail the preferred embodiments thereof with reference to the attached drawings in which.

DETAILED DESCRIPTION OF THE INVENTION

The present invention will now be described more fully with reference to the accompanying drawings, in which preferred embodiments of the invention for tracking motions of an HMD are shown.

According to the present invention, an HMD, the object which is to be tracked, is indicated by markers attached all over the HMD. According to the shooting direction of a video camera some of the markers are hidden and not shown as points on the video camera images. Therefore, it is required to shoot principal markers of the HMD in order to determine the orientation of the HMD.

The HMD in the embodiments described below has markers (principal markers) of different colors or shapes placed at predetermined distances on the HMD and additional markers in order to determine the orientation and position of the HMD. It is noted that at least one principal marker is required to be shot, even though the HMD is shot continuously. Each principal marker is required to be distinguished by its placement position, color, shape, etc. Additional markers are attached in order to determine the orientations and positions of the HMD along with the principal markers based on the direction of motion of the HMD estimated markers.

Figure 1:
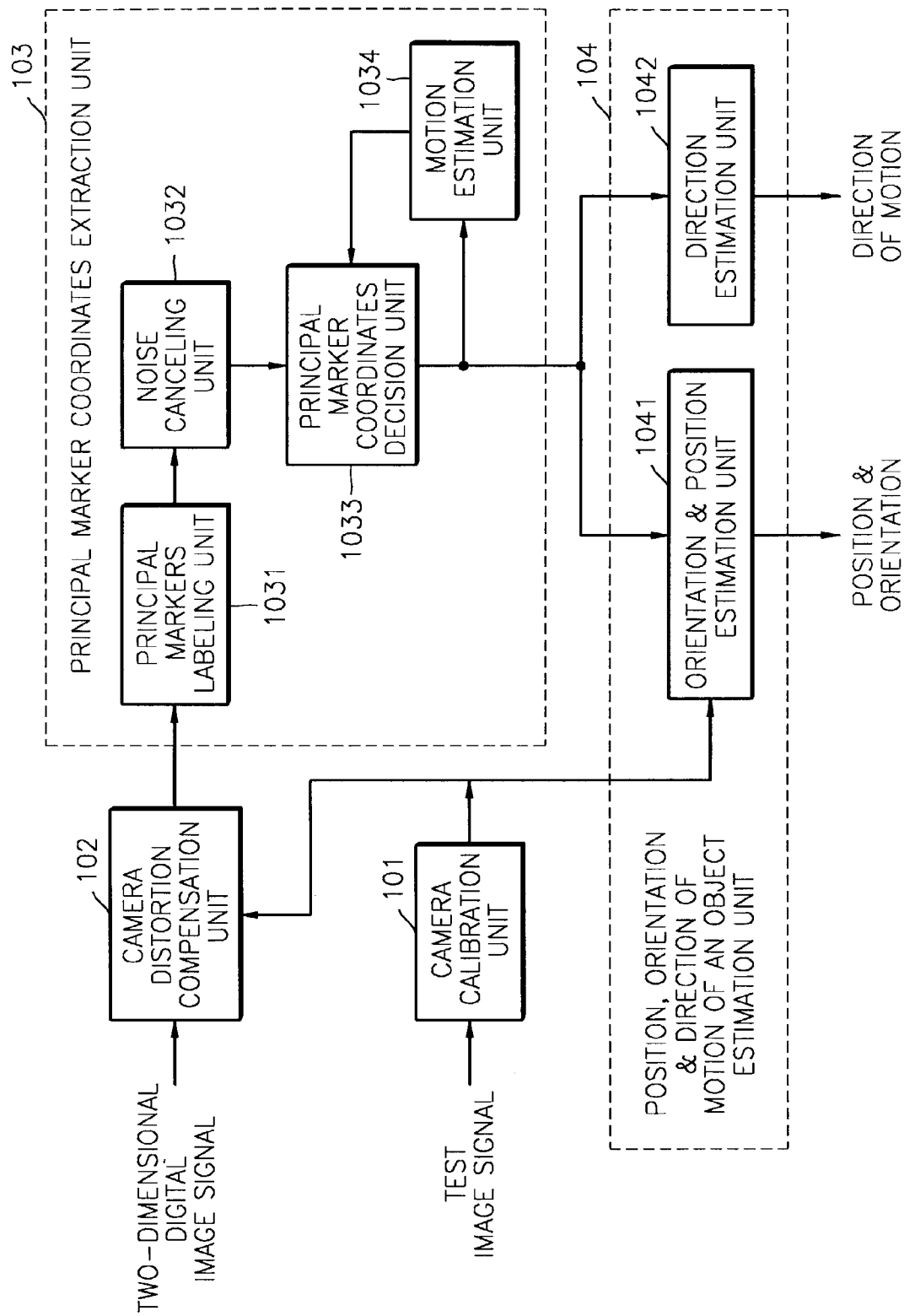
FIG. 1 is a block diagram of a preferred embodiment of a device for tracking position, orientation and direction of motion of an object from video data according to the present invention.

FIG. 1 is a block diagram of a preferred embodiment of a device for tracking motions of an object from video data according to the present invention. The device for tracking motions of an object from video data includes a camera calibration unit 101, a camera distortion compensation unit 102, a principal marker coordinate extraction unit 103, a position, orientation and direction of motion of an object estimation unit 104. The principal marker coordinate extraction unit 103 includes a principal marker labeling unit 1031, a noise canceling unit 1032, a principal marker coordinate decision unit 1033, and a motion estimation unit 1034. In addition, a position, orientation and direction of motion of the object estimation unit 104 includes an orientation and position estimation unit 1041 and a direction estimation unit 1042.

Figure 7:
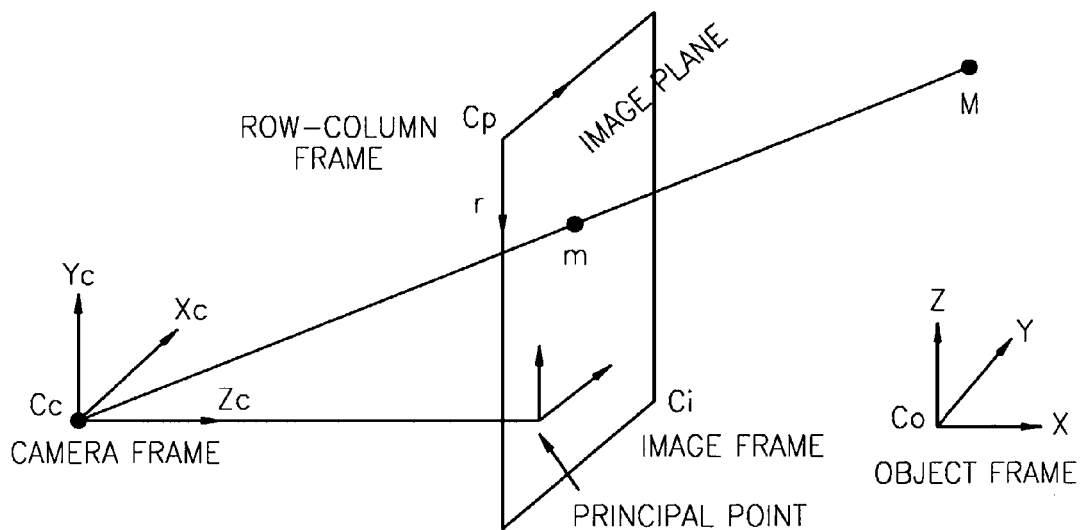
FIG. 7 shows a model for a camera calibration.
Figure 10:
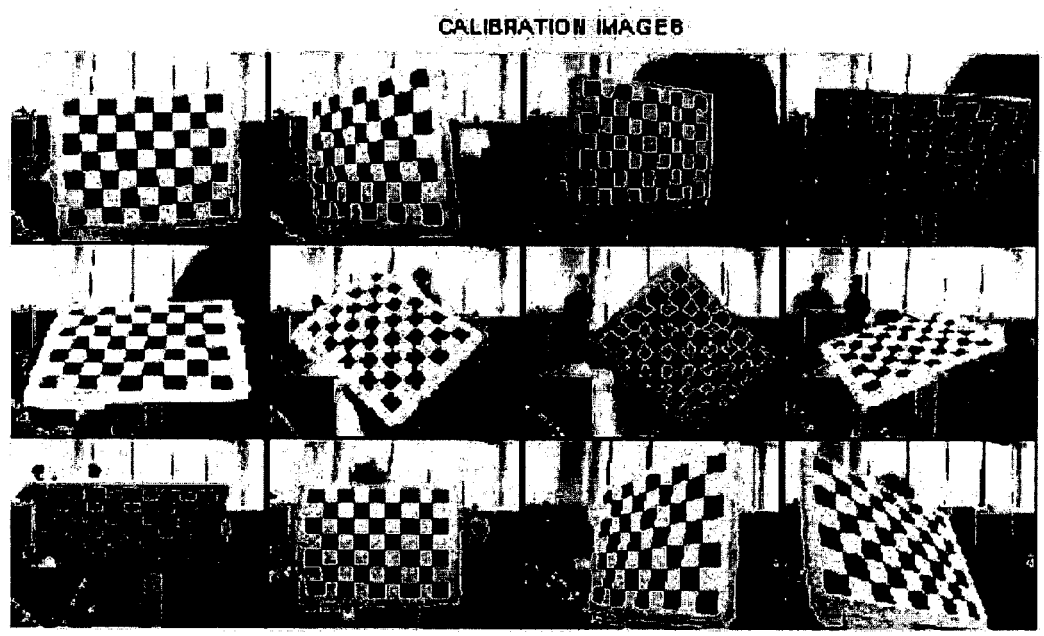
FIG. 10 shows a preferred embodiment of a test image for obtaining intrinsic parameters of a camera.

The camera calibration unit 101 receives test image signals and obtains intrinsic parameters of the camera shooting a moving object. FIG. 10 shows a preferred embodiment of a test image to obtain the intrinsic parameters of the camera, while FIG. 7 shows a model for camera calibration.

A method for obtaining parameters of the camera by camera calibration will be described below with reference to FIG. 7.

First, an intrinsic parameter of the camera, A is obtained by Equation 1.

$$A \equiv \begin{bmatrix} f_x & 0 & c_x \\ 0 & f_y & c_y \\ 0 & 0 & 1 \end{bmatrix},$$ [Equation 1]

Here, $(c_x, c_y)$ denotes the plane coordinates of a principal point, corresponding to a principal marker of FIG. 7 and $(f_x, f_y)$ denotes focal lengths.

An extrinsic parameter [R t] of the camera is obtained by Equation 2.

$$Rt \equiv \begin{bmatrix} r_{11} & r_{12} & r_{13} & t_1 \\ r_{21} & r_{22} & r_{23} & t_2 \\ r_{31} & r_{23} & r_{33} & t_3 \end{bmatrix}$$ [Equation 2]

where, $$R \equiv \begin{bmatrix} r_{11} & r_{12} & r_{13} \\ r_{21} & r_{22} & r_{23} \\ r_{31} & r_{32} & r_{33} \end{bmatrix}$$

is a rotation matrix and $$t \equiv \begin{bmatrix} t_1 \\ t_2 \\ t_3 \end{bmatrix}$$

is a translation vector,

In addition, a relationship between a three-dimensional coordinate of a predetermined marker placed on the object shot by the camera and a two-dimensional coordinate of the principal marker in the displayed image of the object shot by the camera is given by Equation 3.

$$m = A \cdot [Rt] \cdot M$$ [Equation 3]

Here, M denotes the three-dimensional coordinate value of a predetermined marker (position) and m denotes the projected two-dimensional coordinate of the corresponding point in the camera image.

Figure 11:
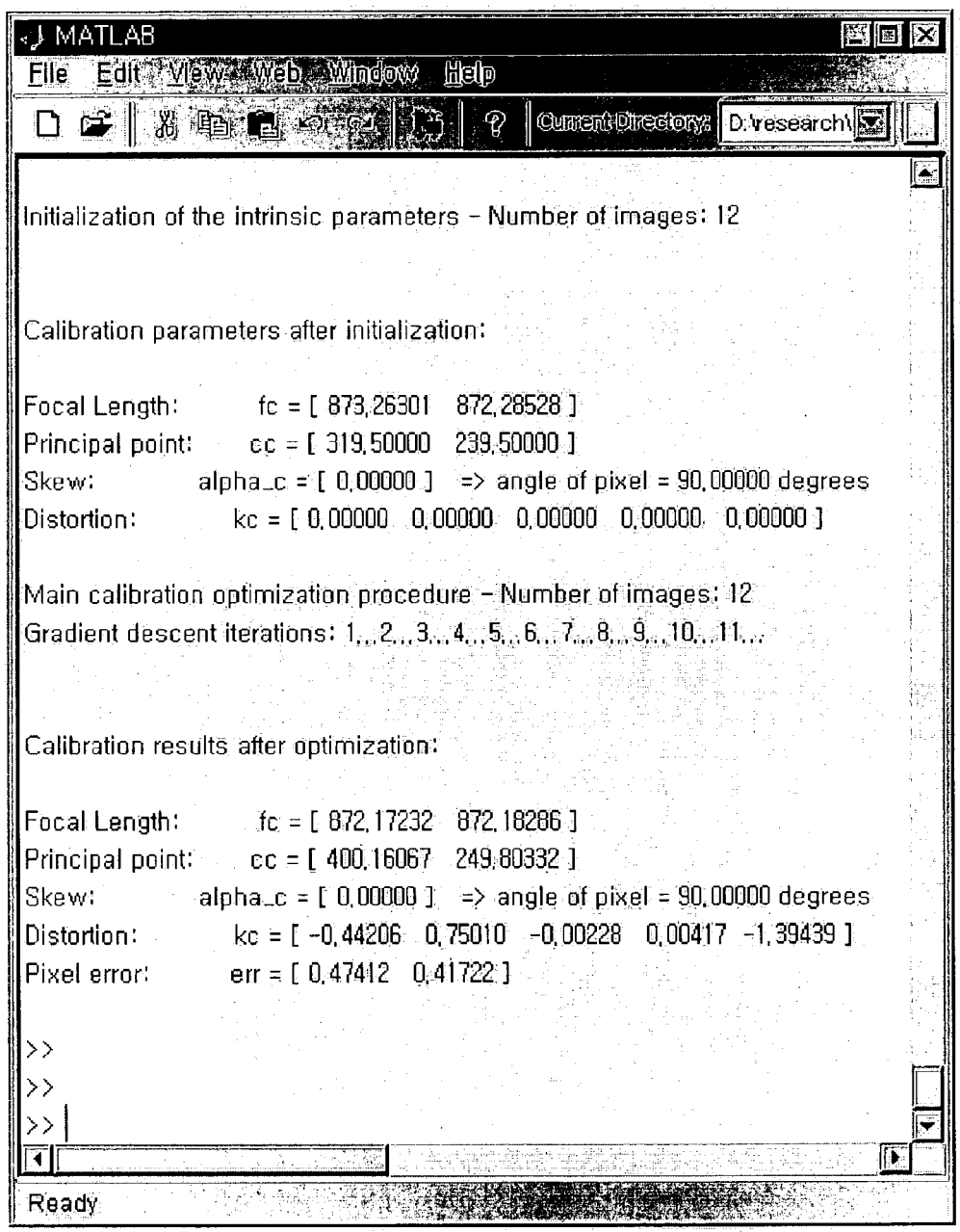
FIG. 11 shows a preferred embodiment of the obtained intrinsic parameters of a camera.

The camera displays images in a scene using intrinsic parameters indicating characteristics of the camera and extrinsic parameters indicating a position and a orientation of the camera. FIG. 11 shows a preferred embodiment of obtained intrinsic parameters of the camera.

The camera distortion compensation unit 102 receives two-dimensional digital video data of an object to be tracked and intrinsic parameter values of the camera from the camera calibration unit 101. The camera distortion compensation unit 102 removes the lens distortions in the input video data based on the intrinsic parameters. Generally, the lens distortion is a radial distortion by a curved surface of the lens. Although it is possible to compensate the lens distortions by using four distortion coefficients, only two distortion coefficients are used in the present invention.

Distortion coefficient $K \neq [k_1, k_2]^T$ satisfies Equations 4 and 5 as follows.

$$\bar{x} \neq x + x[k_1(x^2+y^2) + k_2(x^2+y^2)^2],$$

$$\bar{y} \neq y + y[k_1(x^2+y^2) + k_2(x^2+y^2)^2]$$ [Equation 4]

where, (x,y) is ideal normalized image coordinate, and $(\bar{x}, \bar{y})$ is real normalized image coordinate.

$$\bar{u} \neq u + (u-u_0)[k_1(x^2+y^2) + k_2(x^2+y^2)^2]$$

$$\bar{v} \neq v + (v-v_0)[k_1(x^2+y^2) + k_2(x^2+y^2)^2]$$ [Equation 5]

Here, (u,v) is ideal (distortion-free) pixel image coordinate, $(\bar{u}, \bar{v})$ is real (distorted) observed image coordinate, (x,y) is ideal normalized image coordinate, $(\bar{x}, \bar{y})$ is real normalized image coordinate, $\bar{u} \neq u_0 + a\bar{x}, \bar{v} \neq v_0 + B\bar{v}$, and $u_0, v_0, a, B$ are intrinsic parameters of the camera.

If a user has the values of the intrinsic parameters of the camera, distortion K is given by Equation 6 obtained from the Equation 5.

$$\begin{bmatrix} (u-u_0)(x^2+y^2) & (u-u_0)(x^2+y^2)^2 \\ (u-u_0)(x^2+y^2) & (u-u_0)(x^2+y^2)^2 \end{bmatrix} \begin{bmatrix} k_1 \\ k_2 \end{bmatrix} \equiv \begin{bmatrix} \bar{u}-u_0 \\ \bar{v}-v_0 \end{bmatrix}$$ [Equation 6]

It follows that $DK \neq d$, and $K \neq (D^T D)^{-1} D^T d$

Figure 9A:
FIG. 9A shows an image output by a camera before lens distortion is removed.
Figure 9B:
FIG. 9B shows the image after lens distortion is removed.

After $k_1$ and $k_2$ are obtained using the above formula, an image in which lens distortion is compensated can be obtained. FIG. 9A shows an image output by a camera before lens distortion is removed, and FIG. 9B shows the image of FIG. 9A in which lens distortion is removed.

The principal marker labeling unit 1031 receives an image signal in which lens distortion is compensated from the camera distortion compensation unit 102. A pixel corresponding to the color marker is obtained from the HMD image using binarization. At this time, principal markers and additional markers are divided by assigning different labels to each color, and the images obtained in this step are called labeled images.

The labeling step is performed according to Equation 7 as follows.

$$l(x, y) = \begin{cases} 0, & \text{non-marker} \\ 1, & \bigcap_c \{T_{1,c}^{lower} < p_c(x, y) < T_{1,c}^{upper}\} \\ \vdots & \vdots \\ L, & \bigcap_c \{T_{L,C}^{lower} < P_c(x, y) < T_{L,C}^{upper}\} \end{cases}$$ [Equation 7]

Here, l(x, y) denotes a label of a principal marker (x, y) in the obtained images, $p_c(x, y)$ denotes an intensity value of the principal marker (x, y), for c in a color channel, L denotes the number of the label, $$T_{n,c}^{upper}$$

and $$T_{n,c}^{lower}$$

denote the lower and the upper threshold for the color channel, c and label, n and $\cap\{\cdot\}$ denotes a set satisfying a condition $\{\cdot\}$.

A gray image in which an intensity value ranges from 0 to L, namely, a labeled image is then obtained using Equation 6.

Figure 8:
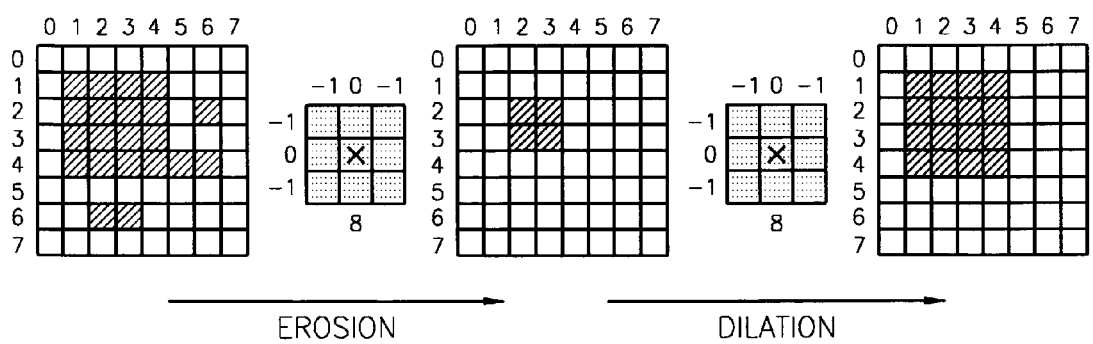
FIG. 8 shows a preferred embodiment in which noise is canceled in principal marker regions by a morphological image processing method.

Furthermore, the noise canceling unit 1032 receives labeled video data from the principal marker labeling unit 1031 and cancels noise therein. The labeled images are usually influenced by background noise, which is canceled by a morphological image processing method, such as an opening filter. FIG. 8 shows a preferred embodiment in which noise is canceled from a principal marker region by a morphological image processing method.

The principal marker decision unit 1033 obtains a two-dimensional coordinate of the points from the image in which noise is canceled and provides two-dimensional coordinates of the points estimated in the motion estimation unit 1034 to a position, orientation and direction of motion estimation unit 104. It is possible for a user to select the coordinates to be output between the two-dimensional coordinate of the points obtained from the images in which noise is canceled and a two-dimensional coordinate of the points in the images provided by the motion estimation unit 1034. The two-dimensional coordinate of the points obtained from the images in which noise is canceled is very close to the ideal value. The motion estimation unit 1034 has an advantage in that it can track positions of the points using the two-dimensional coordinates of the principal markers provided by the motion estimation unit 1034.

Figure 2:
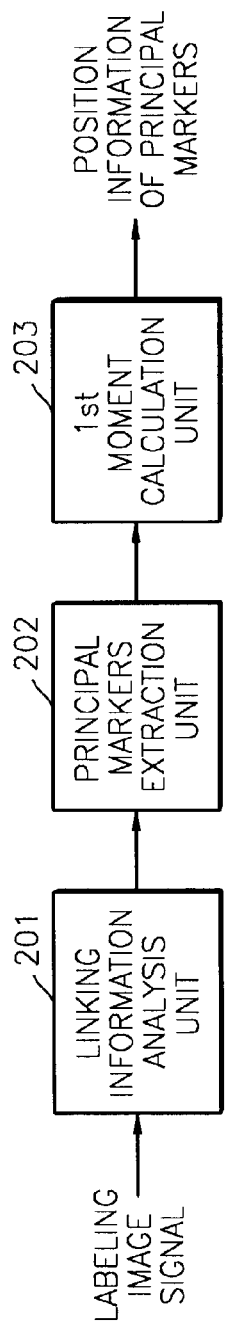
FIG. 2 is a detailed block diagram of the principal marker coordinate decision unit of FIG. 1.

FIG. 2 is a detailed block diagram of the principal marker decision unit of FIG. 1. First, the linking information analysis unit 201 receives labeled image data in which noise is canceled. The labeled images are similar to grayscale images, if each label value is considered as being the brightness intensity. It is possible to divide the regions of all the points by obtaining linking information on the pixels of the regions of the points.

The principal marker extraction unit 202 receives information on the regions of the points obtained from the linking information analysis unit 201 and removes noisy regions which are very small regions beside the points, which are determined to be the principal marker regions. Each region finally labeled through above described processes becomes a region corresponding to principal markers in the two-dimensional image.

The first moment calculation unit 203 receives two-dimensional images labeled as the principal marker regions and obtains the center coordinates of the principal marker regions. The center coordinates can be obtained by the first moments namely, means with respect to the centers of corresponding point regions.

The motion estimation unit 1034 receives a two-dimensional coordinate of the principal marker from the principal marker decision unit 1033. Then, the motion estimation unit 1034 tracks positions during motions of the principal markers by estimating the motions of the principal markers in the next frame of the image by a color histogram and a color object tracking method, which uses a Kalman filter.

The method for tracking positions during motions of the principal markers is as follows.

First, color histogram ($h_j$, j=1,2, . . . ,J) of the region of the $i^{th}$ ($f_i^N$, i=1,2, . . . ,I) principal markers in $N^{th}$ frame is obtained. Then, a color histogram $H_j$ for the searching region with respect to $f_i^N$ in the $N+1^{th}$ frame is obtained. Here, I and J denote the number of detected points and the number of bin of the histogram, respectively. Then, a histogram probability $$P_j \equiv \frac{h_j}{H_j}$$

is obtained in the searching region.

The probability that each pixel in the search region is a marker is represented by a histogram probability map, which is the histogram of the probability of a bin number of a corresponding pixel. The histogram probability map is then multiplied using a Kalman filter, and a kernel for weights. A mean of the coordinate value with respect to the expected result is a coordinate of the $i^{th}$ point, in the $N+1^{th}$ frame $$f_i^{N+1},$$

and a principal marker is tracked by repetition of the above.

Figure 12:
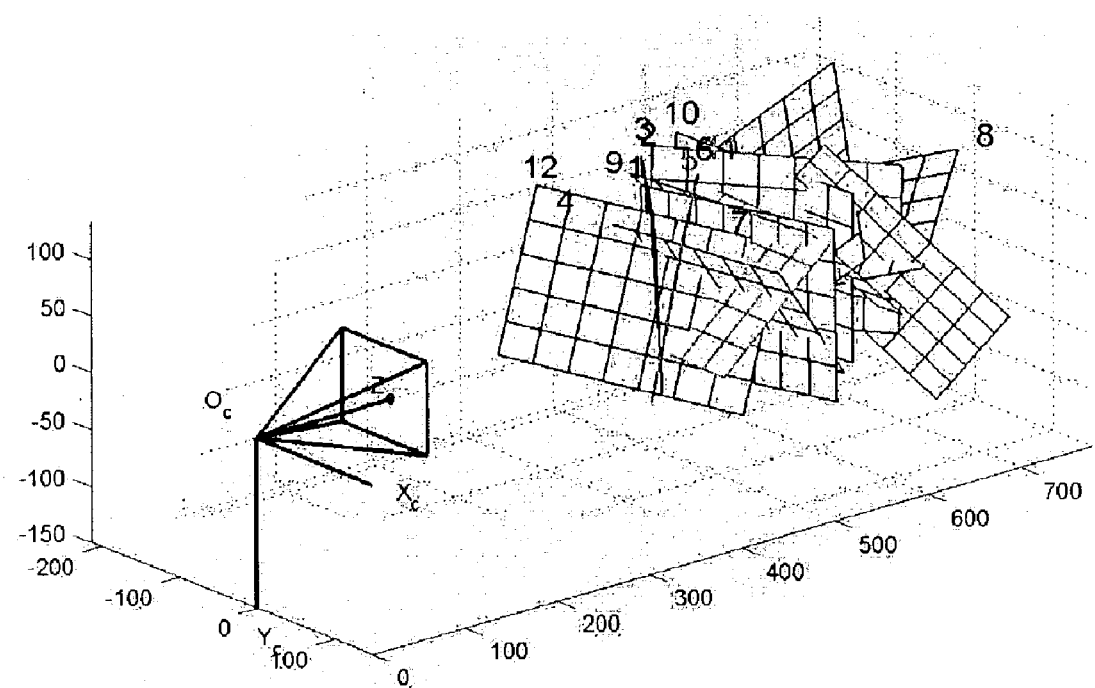
FIG. 12 shows the result of estimating a position and an orientation of a checkered panel in the test image in FIG. 10.

The orientation and position estimation unit 1041 receives intrinsic parameters of the camera from the camera calibration unit 101 and a two-dimensional coordinates of the markers from the principal marker decision unit respectively. The orientation and position estimation unit 1041 calculates the extrinsic parameter value [Rt], including the orientation and position information of the HMD using Equation 2, based on the intrinsic parameters, two-dimensional coordinates of the principal markers and three-dimensional coordinates of the principal markers displayed on the HMD. FIG. 12 shows an example of estimating the position and orientation of the HMD, using the extrinsic parameter of the camera and the result of estimating the position and orientation of a checkered panel in the test image of FIG. 10.

Figure 6:
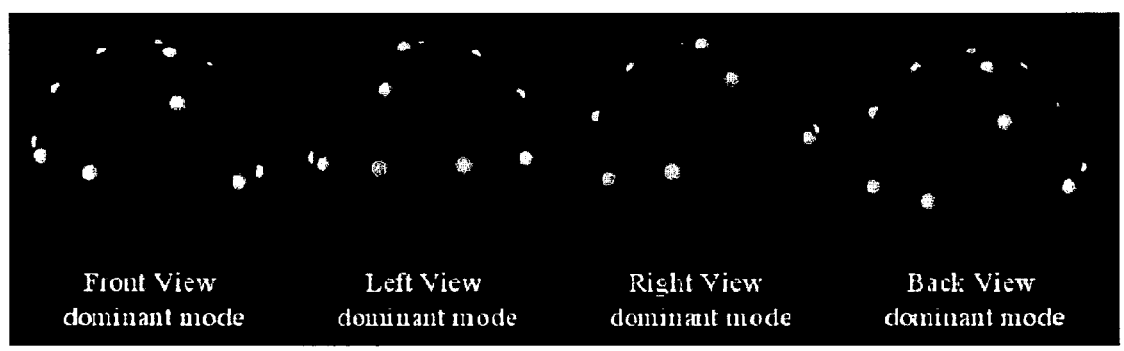
FIG. 6 shows a preferred embodiment to estimate the direction of motion of a Head Mounted Display (HMD) that uses the present invention.

The direction estimation unit 1042 receives two-dimensional coordinate values of the principal markers displayed on an image of the HMD from the principal marker decision unit 1033, decides which of the principal points displayed correspond to the principal markers of the HMD, and outputs an approximate time for tracking the markers of the HMD. FIG. 6 shows a preferred embodiment of estimating a direction of the Head Mounted Display adapting the present invention.

Figure 3:
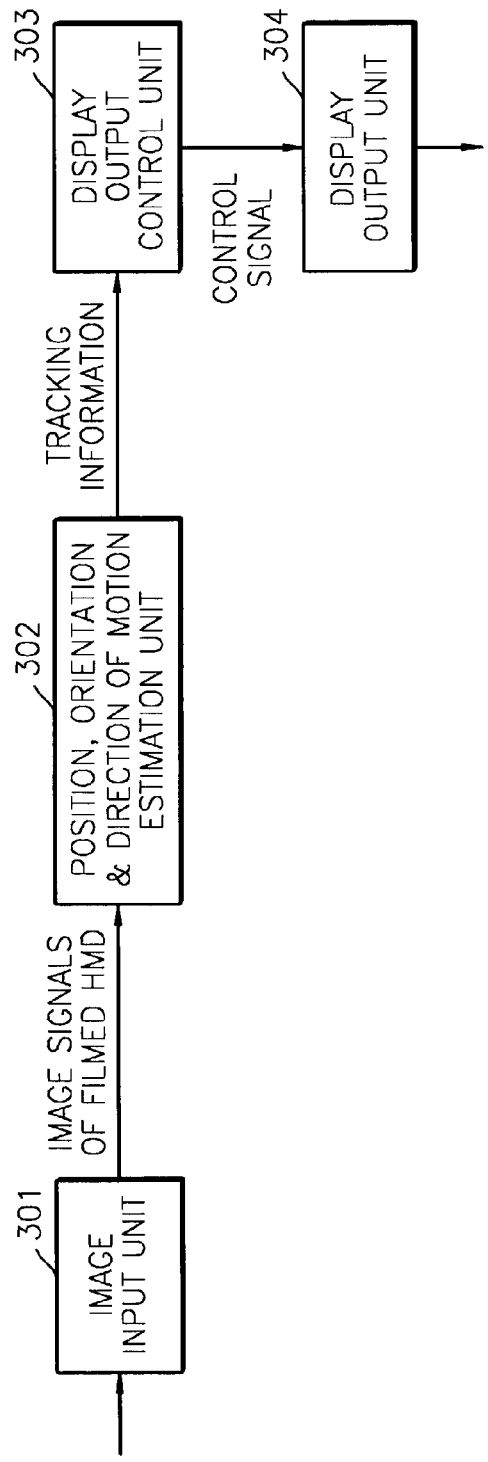
FIG. 3 is a block diagram of a preferred embodiment of a personal display device adapting the device for tracking position, orientation and direction of motion of an object from video data according to the present invention.

FIG. 3 is a block diagram of a preferred embodiment of a personal head mounted display device (HMD) adapting the device for tracking position, orientation and direction of motion of an object using video data according to the present invention. First, the image input unit 301 receives images of the HMD shot by an exterior camera and provides them to the position, orientation and direction estimation unit 302.

The position, orientation, and direction of motion estimation unit 302 extracts the position and orientation information of the HMD and time information regarding the shooting of the HMD, from the image signals of the HMD and outputs the position, orientation and direction of motion to the display output control unit 303.

The display output control unit 303 receives the position, orientation and direction of motion and generates control signals that control a display output unit 304. The display output unit 304 receives control signals from the display output control unit 303 and outputs video data corresponding to the position, orientation and direction of motion information according to the control signal.

Figure 4:
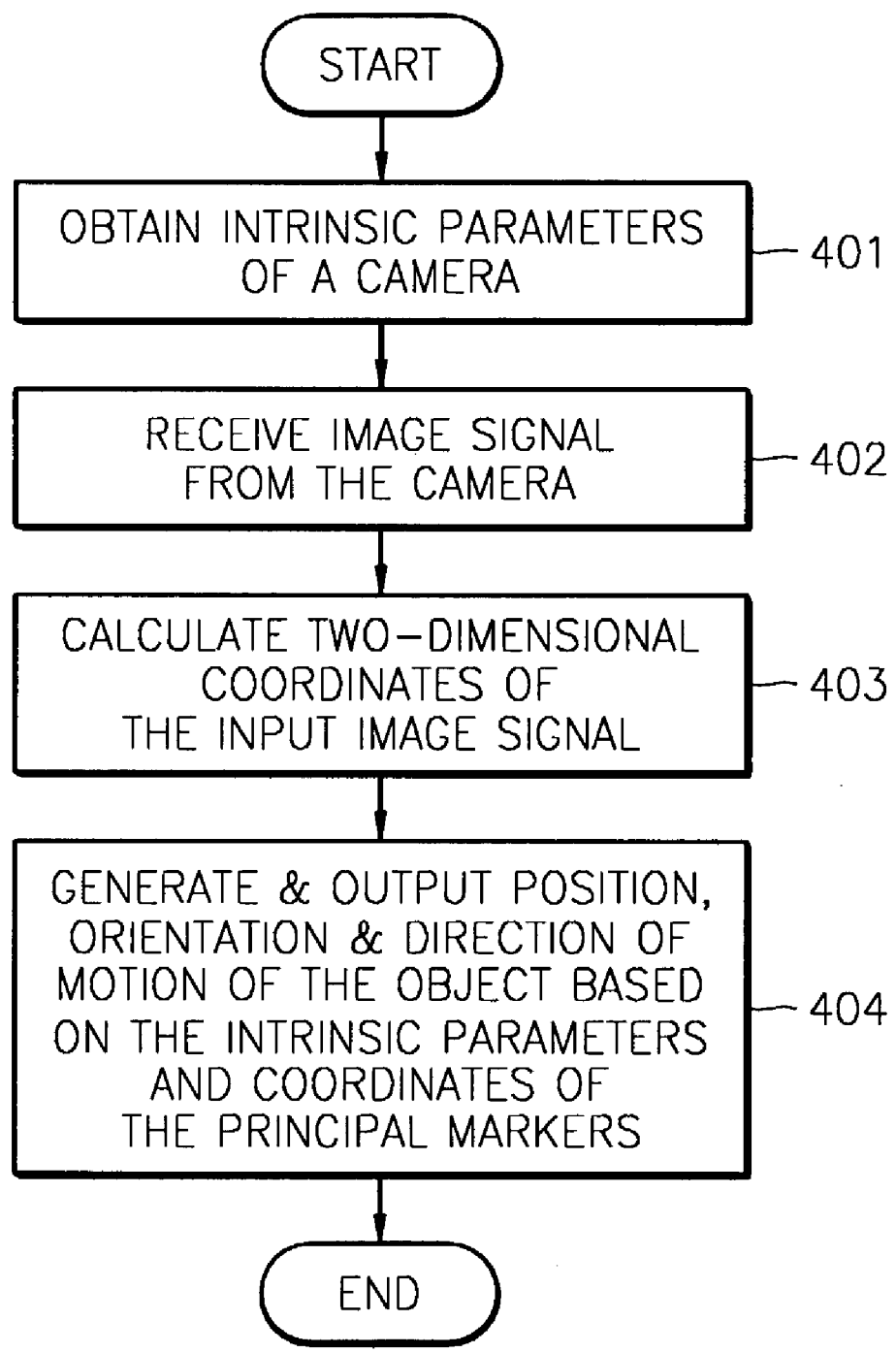
FIG. 4 is a flow chart showing preferred embodiments of a method for tracking position, orientation and direction of motion of an object from video data.

FIG. 4 is a flow chart showing a preferred embodiment of a method for tracking the position, orientation, and a direction of motion of an object from video data according to the present invention. First, intrinsic parameters of the camera are obtained (step 401), then video data of an object for estimating the position, orientation and direction of motion information from the camera is input (step 402). Then, two-dimensional coordinates of the markers set on the object are calculated from the input image signal (step 403). Then, position, orientation and direction of motion is extracted and output based on the intrinsic parameters, two-dimensional coordinates of the markers and three-dimensional coordinates of the markers set on the object (step 404).

Figure 5:
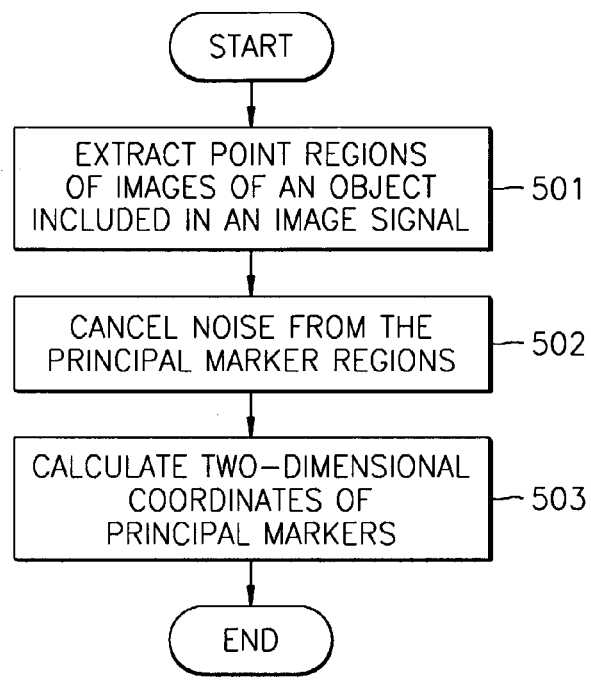
FIG. 5 is a flow chart showing details of step 403 of FIG. 4.

FIG. 5 is a flow chart showing details of step 403 of FIG. 4. First, principal marker regions are extracted from the image of the tracked object and included in video data (step 501). Second, noise is canceled in the point regions (step 502) and two-dimensional coordinate values of the points are calculated (step 503).

The embodiments of the present invention as described above can be written as software programs which can be run on common digital computers and embodied in a computer-readable medium such as magnetic storage devices, a floppy disk, a hard disk, etc., optical readable devices, CD-ROM, DVD, etc. and carrier waves to be transmitted via the Internet.

While this invention has been particularly shown and described with reference to preferred embodiments thereof, it will be understood by those skilled in the art that various changes in form and details may be made therein without departing from the spirit and scope of the invention as defined by the appended claims.

According to the present invention, it is possible to set markers on a predetermined object, process the video data of the object and determine the position, orientation and direction of motion of the object. Therefore, the present invention does not make use of a camera attached to the object to be tracked (for example, an HMD) or a sensor (a magnetic sensor, a gyroscope sensor, etc.) attached to the object to be tracked. The present invention compared to the prior art, does not increase the weight of the object to be tracked and ensures uniform wear of the object.

In addition, method and device of the present invention do not suffer from distortions due to metallic materials near the object to be tracked, unlike the case of using a magnetic sensor, the device can track both position and orientation of an object unlike the case of using a gyroscope, and has good portability because the device uses a video camera as a sensor for tracking an object.

What is claimed is:

1. A device for video tracking motions of an object, the device comprising:

a calibration unit for obtaining intrinsic parameters of a video camera;

a camera distortion compensation unit for receiving video data, acquired by the video camera, of a predetermined object on which at least one principal marker having a predetermined position is set and removing lens distortion from the received video data using the intrinsic parameters of the camera;

a principal marker coordinate extraction unit for receiving the video data from which lens distortions are removed by the camera distortion compensation unit, and extracting two-dimensional coordinates of the video data of the principal marker set on the object, wherein the principal marker coordinate extraction unit comprises:

a principal marker labeling unit for receiving the video data from which lens distortions are removed by the camera distortion compensation unit, assigning different labels to each color of marker and separating the markers into principal markers and additional markers, a noise canceling unit for receiving information about principal points corresponding to the principal markers, and additional points, corresponding to the additional markers from the principal marker labeling unit and canceling noise in two-dimensional regions of the principal markers, and a principal marker decision unit for receiving information about the two-dimensional regions of the principal markers and the additional points from which noise is canceled by the noise canceling unit and obtaining two-dimensional coordinates of the points in an image; and a position, orientation and direction of motion estimation unit for estimating and outputting a position, orientation and direction of motion of the object, based on the two-dimensional coordinates input from the principal marker coordinate extraction unit, the intrinsic parameters of the camera input from the calibration unit and three-dimensional coordinates of the at least one principal marker set on the object.

2. The device for video tracking motions of an object of claim 1, wherein the principal marker coordinate extraction unit further comprises a motion estimation unit for receiving the two-dimensional coordinates of the points in the image from the principal marker decision unit and estimating a direction of motion of the points.

3. The device for video tracking motions of an object of claim 1, wherein the principal marker decision unit comprises:

a linking information analysis unit for receiving the labeled video data from which noise is canceled by the noise canceling unit and for separating the regions of the points from the images, based on linking information of the pixels corresponding to each principal marker region in the image;

a principal marker extraction unit for receiving information of the principal marker regions from the linking information analysis unit and extracting principal marker regions from the image by removing regions which are not principal marker regions, based on brightness information of the markers set on the object or relationship information about the markers; and a first moment calculation unit for receiving information about the extracted principal marker regions, obtaining a mean of coordinate values of the points pixels and obtaining coordinates of the points.

4. The device for video tracking motions of an object of claim 1, wherein the position, orientation and direction estimating unit comprises:

an orientation and position estimation unit for estimating the position and orientation of the object, based on the intrinsic parameters of the camera received from the camera calibration unit, coordinates of the points received from the principal marker decision unit, and three-dimensional coordinates of the markers set on the object; and a direction estimation unit for estimating a direction of motion of the object, based on the coordinates of the principal makers received from the principal marker decision unit.

* * * * *